UNITED STATES PATENT OFFICE.

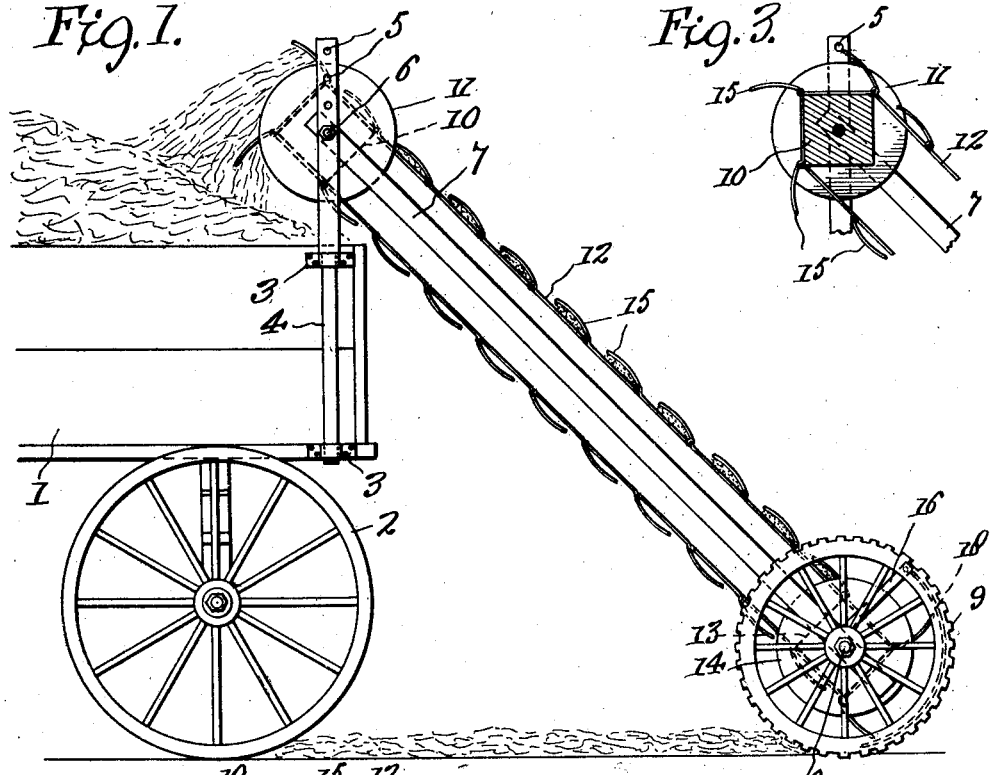
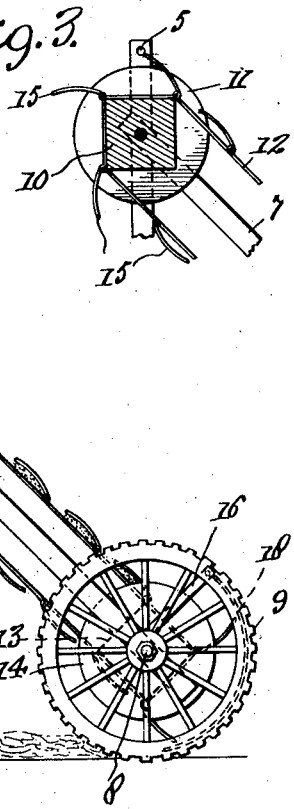
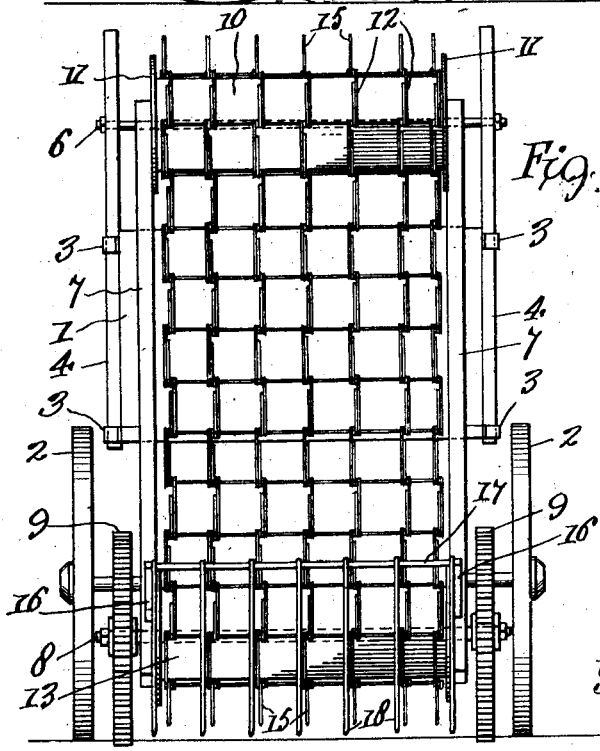
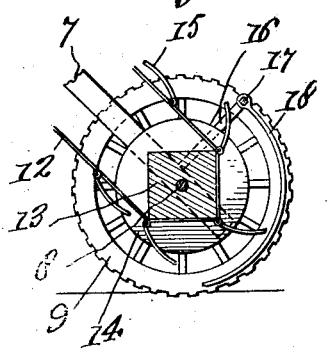

HAROLD COLVOCORESSES, OF ATLANTA, GEORGIA.

HAY RAKING AND LOADING DEVICE.

1,361,685.  Specification of Letters Patent.  Patented Dec. 7, 1920.

Application filed June 26, 1920. Serial No. 391,982.

*To all whom it may concern:*

Be it known that I, HAROLD COLVOCORESSES, a citizen of the United States, residing at Atlanta, in the county of Fulton and State of Georgia, have invented certain new and useful Improvements in Hay Raking and Loading Devices; and I do hereby declare the following to be a full, clear, and exact description of the invention, such as will enable others skilled in the art to which it appertains to make and use the same.

The present invention relates to improvements in hay raking and loading devices, and has for an object to provide a simple and compact construction made in such a way as to be attachable to the rear end of a hay wagon and acting to transfer the hay to the wagon as the latter is drawn across the field.

The invention has for another object to dispense with two operations which are necessarily practised at the present time, namely, first, of raking the hay into windrows or piles, and second, the loading of the hay into the wagon by forks or otherwise.

A further object of the invention resides in providing a device which will economize in the use of labor necessary to rake and load the hay into the wagon, inasmuch as the improved device is automatic in action and needs no attention, the driver of the wagon being the only necessary operative employed.

In the accompanying drawings forming a part of this application, and in which similar reference symbols indicate corresponding parts in the several views:

Figure 1 is a fragmentary side elevation of a hay wagon having the improved attachable hay raking and loading device applied thereto.

Fig. 2 is a rear view of the same.

Fig. 3 is a fragmentary sectional view of the top portion of the conveyer or elevator; and Fig. 4 is a similar view of the lower portion thereof.

Referring more particularly to the drawings, 1 designates a hay wagon of usual construction, the rear portion only of which is illustrated, and 2 represents the rear supporting wheels of such hay wagon.

In accordance with the present invention the hay wagon 1 is provided with a suitable number of metal straps 3 at the sides thereof near the rear in which to receive a pair of vertical standards or posts 4 projecting to a considerable height above the top portion of the wagon. The standards or posts 4 form the means to removably carry the attachable hay rake and loader, and for this purpose the upper portions of the standards or posts 4 are provided with a series of perforations 5 adapted to receive the pin or rod 6 to which the upper ends of the conveyer or elevator beams 7 are attached. The pin or rod 6 forms a pivotal support for the conveyer or elevator and allows it to swing up and down as required by the uneven character of the ground over which the device moves.

The lower ends of the beams 7 support an axle 8 on which are mounted with ratchet lock the drive wheels 9 having toothed peripheries which come in contact with the ground and insure the rotation of the wheels as the device moves along.

On the upper rod 6 is mounted a drum 10 having heads or flanges 11 to prevent the conveyer 12 from escaping laterally therefrom. In a similar way the lower shaft is provided with a drum 13 having heads 14. The drums are either square or rectangular in cross section, as indicated in Figs. 3 and 4, for the purpose of action to open the prongs 15 that extend from the conveyer 12.

The conveyer 12 may be formed of an open wire structure or of any other form desirable or necessary, the prongs 15 being arranged thereon in such a way that they normally lie in substantial parallelism with the body portion of the conveyer 12, except when the same are passing about the square drums 10 and 13. At these points the body portion of the conveyer moves at right angles about the square portions of the drum, while the prongs 15 project at substantially right angles to the preceding portions of the conveyer, so that a large space is created between the conveyer and the prongs to receive the hay and to permit its free discharge.

At the lower end of the conveyer the beams 7 carry arms 16 extending upwardly and rearwardly and having secured to their upper ends a rod 17 carrying a number of downwardly and forwardly curved rake bars 18; the rake bars 18 form a trough in which to catch the hay from the ground as the machine moves along, and through which trough pass the prongs 15 of the conveyer, as indicated in Fig. 4.

In operation the wagon is drawn along, the rake bars 18 catching the hay from the ground and drawing it up into the trough where it is picked up by the prongs 15 as they open out in passing about the lower drum 13; this action is shown in Fig. 4.

The prongs 15, after receiving the hay from the rake bars 18, move upwardly over the upper run of the conveyer, such prongs closing downwardly against the hay caught therein after they leave the lower drum 13. When the prongs arrive at the upper drum 10 they will open out so as to release the hay and allow its free deposit in the wagon body. The unoccupied prongs will then close and descend over the lower run of the conveyer until they arrive at the rake bars, when they receive a fresh supply. It will be noted that the prongs tightly clamp the hay against the conveyer as the same is being lifted and prevent its being blown therefrom or otherwise being released.

The rod 6 may be adjusted in the perforations 5 to place the device at the desired elevation and at the desired angular relation, so that the same may be fitted to various types of wagon bodies.

It is obvious that those skilled in the art may vary the details of construction and arrangements of parts without departing from the spirit of my invention, and therefore I do not wish to be limited to such features except as may be required by the claims.

I claim:

1. An improved hay rake and loader comprising a conveyer, means to attach said conveyer to a wagon, means for moving the conveyer, prongs on the conveyer for catching the hay, and means adapted to cause the prongs to open outwardly at the upper and lower ends of the conveyer, substantially as described.

2. In combination with a wagon, a hay rake and loader adapted to be removably attached thereto including means for effecting the attachment, a conveyer carried by said means, actuating means for the conveyer, prongs carried by said conveyer and normally lying in substantial parallelism therewith, and means adapted to cause the prongs to open out from the parallel relation at the upper and lower ends of the conveyer, substantially as described.

3. In an improved hay raking and loading device, the combination of a conveyer belt, prongs carried thereby, and drums having a rectangular cross section adapted to cause the opening of the prongs, substantially as described.

4. In combination with a wagon, of a conveyer comprising a belt, drums having a rectangular cross section for moving said belt, prongs carried by said belt and adapted to open outwardly when passing over said drums, means for adjustably attaching said conveyer to the wagon body, and ground wheels having connection to the lower drum for driving said conveyer, substantially as described.

5. In combination with a wagon body, of standards removably carried thereby and having perforations in their upper ends, a rod adjustably fitted in the perforations, a pair of beams carried by said rod, a shaft journaled in the lower ends of said beams, square drums carried by said rod and shaft, a conveyer belt passing over said square drums and composed of open wire-work arranged to provide links pivoted together, prongs projecting from the links and adapted to normally extend in substantial parallelism with the preceding links, toothed wheels carried by the lower shaft, and curved rake bars forming a trough about said lower drum, substantially as described

HAROLD COLVOCORESSES.